UNITED STATES PATENT OFFICE.

GEORGE R. CORNWALL, OF PORT CHESTER, NEW YORK.

PROCESS OF INTAGLIO PRINTING.

SPECIFICATION forming part of Letters Patent No. 607,915, dated July 26, 1898.

Application filed April 5, 1897. Serial No. 630,889. (No specimens.)

*To all whom it may concern:*

Be it known that I, GEORGE R. CORNWALL, a citizen of the United States, residing at Port Chester, county of Westchester, State of New York, have invented a new and useful Process of Intaglio Printing, of which the following is a specification.

This invention relates to improvements in processes for intaglio printing. In such printing the design is engraved or sunk into the surface of a plate or roll, and having been filled with ink the superfluous ink is removed and an impression taken, by pressure, from the plate. In carrying out this process the greatest care must be taken in wiping off the superfluous ink and in removing it absolutely from the surface of the uncut portions of the plate. This, for fine work, has always been such a difficult and delicate matter that hand rubbing has always been resorted to, making the process an extremely slow and expensive one. In order to give the ink sufficient body to give firm solid lines, the use of a comparatively hard or solid ink has been necessary, and to enable this to be readily withdrawn from the engraved lines it has been usual to apply enough heat to the plate to loosen the adherence between the plate and the ink, the latter then leaving the plate freely.

The object of my invention is to dispense with the necessity of hand rubbing, or of rubbing off or scraping off of any kind, while at the same time permitting the use of heat to facilitate the release of the ink from the lines. For this purpose I apply to the uncut surface of the plate a substance which repels or rejects the ink used to fill the lines. Thus in case of a greasy ink being used I apply to the uncut or blank parts of the plate sufficient moisture or moisture-containing substance to prevent the adherence of any ink to those portions. On then "rolling up" the plate with a roller containing greasy ink the ink will be taken up only by the lines and the blank portions will remain free from ink. For this purpose it is evident that a plate must be used which is to some extent absorbent or retentive of moisture. In order that good results may be obtained, however, it is desirable to apply heat to the plate before taking an impression, as above mentioned, and for this purpose metallic plates have the advantage. While for certain purposes the required qualities of an absorbent surface and of heat conductivity can be obtained by a zinc or other metal plate having its surface gummed or otherwise treated so as to retain water, I prefer to obtain both the absorbent or adherent and the conducting properties in the most perfect manner by the use of aluminium plates properly ground and cleaned, so as to expose the soft or porous interior of the plate freed from all impurity. This pure soft aluminium surface is very tenacious of water when once moistened.

My process as applied to an aluminium plate is therefore as follows: The plate having been ground so as to expose the soft uniform exterior of the plate and having been cleaned with appropriate alkaline and acid bath to remove all grease and other impurities, the design is engraved or etched into the surface of the plate in any suitable manner. If the method of formation of the design is such as to leave any material on the plate, this material is carefully removed by chemical or mechanical means, or both, so as to leave the flat or blank portions of the plate perfectly clean. The surface of the plate is then moistened in any suitable manner, as by a water-roller, the amount of water applied being extremely small, but yet enough to cover the uncut surface of the plate with a film of moisture sufficient to repel or keep off the greasy ink therefrom. To facilitate the absorption and distribution of the moisture from the water-roll, it is desirable to gum up the engraved plate in the manner usually practiced in lithographic printing. The essential feature is that the uncut or unengraved surface is left in a condition to reject or repel the greasy ink which is taken up by the engraved portions. The plate is then rolled up with the greasy ink, which is deposited only in the lines or cuts, leaving the uncut portions free from ink. For this rolling up a comparatively hard roll, such as a leather roll, may be used. An impression may then be taken by pressing a sheet of paper against the plate, and the ink is then renewed by again rolling up. To insure against catching or taking up of the ink by the blank portions of the plate, moisture must also be supplied to these portions from time to time, as in ordinary lithographic processes.

I use a comparatively hard or solid ink, so as to give sharp and strongly-marked lines capable of standing up in high relief on the print. To enable the ink to fully penetrate the engraved lines and to leave the same easily and cleanly, I heat the plate, so as to keep the ink soft till the printing is effected. My process thus involves two essential features—namely, applying moisture to the unengraved portion of the plate, so as to prevent adherence of ink thereon, and applying heat to the plate, so as to enable the ink to fill the lines and to free itself therefrom. Each of these features has been used heretofore, the former in lithographic and the latter in engraving work; but my invention lies in combining them into one process in connection with engraved metal plates, whereby the process of intaglio printing is greatly simplified and expedited in that the slow rubbing off of the plate by hand to clean it of superfluous ink is obviated.

The aluminium plate which I prefer to use is eminently adapted for the process, as above set forth, as by reason of its porosity it "takes" and retains the moisture and by reason of its conducting power it transmits the heat readily.

The heating of the plate may be effected by placing it upon a heating table or plate, which is kept warm in any suitable way, or the heating may be effected in any suitable manner. It is essential that the plate should be warm during the time that the ink is being applied thereto, and it may therefore be heated during the application of the greasy ink thereto and would then in general remain sufficiently warm during the printing process. The plate may, however, be kept continuously warm by a source of heat, such as a flame or heating-coil in proximity thereto, or it may be sufficiently massive to retain the warmth for a considerable time, being only occasionally heated, as required.

It will be understood that the plate above referred to may at any stage of the process be bent into a cylindrical shape or around a printing-cylinder, so as to enable it to be used in a rotary or cylinder press. On the other hand, if it is desired to use as a printing ink or medium a substance containing or having an attraction for water, then the blank portions of the plate should be coated with a greasy material, which tends to repel or keep off this watery ink. In either case the application of the ink-repellent substance may be effected either before or after the engraving of the design. If it is applied before engraving, then the act of engraving will remove it from the engraved parts. If it is applied after engraving, the fact that the engraved lines are depressed and are also in general inked with a greasy material prevents them from taking up the substance—for example, moisture—which is only applied in a mere film.

Having thus described my invention, the following is what I claim as new therein and desire to secure by Letters Patent:

1. The process of intaglio printing which consists in producing an intaglio design on a metal plate, applying moisture to the portion of the plate surrounding the design, applying greasy ink to the plate, the same being taken up only by the design, heating the plate during the application of such greasy ink and taking an impression therefrom.

2. The process of intaglio printing, which consists in producing an intaglio design in a metal plate, applying moisture to the unengraved portion of the plate, applying greasy ink to the plate, the same being taken up only by the design, and taking an impression from the plate, heat being applied to the plate so that it will be warm while the greasy ink is applied thereto and an impression taken therefrom.

3. The process of intaglio printing which consists in producing an intaglio design on an aluminium plate, applying moisture to the parts of the plate surrounding the design, applying greasy ink to the plate, the same being taken up only by the design, and taking an impression therefrom, the plate being heated so as to be warm while the ink is applied thereto and the impression taken therefrom.

GEORGE R. CORNWALL.

Witnesses:
M. V. BIDGOOD,
J. GREEN.